Oct. 20, 1936.  W. H. MOSS  2,057,689
ELECTRICAL CONDUCTOR
Filed Nov. 27, 1931
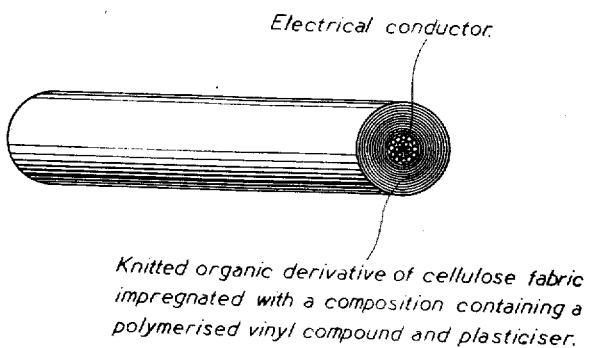
Electrical conductor.
Knitted organic derivative of cellulose fabric impregnated with a composition containing a polymerised vinyl compound and plasticiser.
INVENTOR
William H. Moss
BY
ATTORNEYS Patented Oct. 20, 1936

2,057,689

UNITED STATES PATENT OFFICE 2,057,689

ELECTRICAL CONDUCTOR

William Henry Moss, London, England, assignor to Celanese Corporation of America, a corporation of Delaware Application November 27, 1931, Serial No. 577,700
In Great Britain December 24, 1930

6 Claims. (Cl. 173—264)

This invention relates to the manufacture of flexible materials, and more particularly flexible composite materials suitable for use in insulation or other purposes.

It is well-known to impregnate woven textile fabrics with cellulose acetate, cellulose nitrate or like compositions for electrical insulation purposes, in which application impregnated tapes or the like are wound round an electrical conductor and may subsequently be heated so as to cause the separate layers to adhere and even become homogeneous.

I have now found that from the point of view of flexibility much superior products are produced by employing as a base for impregnation or coating purposes a knitted or netted textile fabric. The invention includes impregnating such a fabric with any desired lacquer base, for example a lacquer containing cellulose acetate or other cellulose ester or ether, including cellulose nitrate, with or without resins or a simple lacquer containing a resin only or a lacquer or doping composition containing polymerized vinyl acetate or other polymerized vinyl compounds with or without natural or artificial resins.

The base fabric for use in accordance with the present invention may be made of any desired material, for example cotton or viscose or other cellulosic artificial fibre, but I have found that especially valuable results are produced, particularly for electrical insulating purposes, when the base fabric consists of or contains cellulose acetate or other cellulose ester or ether.

Preferably the impregnating or coating composition to be applied to the base fabric in the case of the latter containing cellulose ester or ether will not contain the same cellulose ester or ether or at least will not contain a cellulose ester or ether of the same solubility characteristics. It is possible to apply to a base fabric containing a cellulose ester or ether a solution of a cellulose ester or ether in a solvent which will attack the ester or ether in the base fabric without producing an undesirable decrease in strength of the fabric, but it is preferable to apply a composition which does not materially attack the base fabric at all. If it is desired to apply the same cellulose ester or ether it may be applied in emulsion form, as for example an emulsion formed by the addition of butyl acetate and water to an acetone solution of cellulose acetate. Such emulsions yield coherent films on the base fabric, but nevertheless the application by this method is somewhat difficult and it is desirable to use a base of the doping composition different from the base of the fabric.

As already indicated, for electrical insulation purposes it is highly advantageous to employ a base fabric made of or containing cellulose acetate or other cellulose ester or ether, and I have found that it is further of great advantage to apply to such a base fabric a composition containing a polymerized vinyl acetate or other polymerized vinyl compound. The combined fabric couples the high insulating properties of the composite material (and in this connection see U. S. application S. No. 577,699 filed on even date herewith corresponding to British application No. 38,954/30) with the very high degree of flexibility attributable to the use of the knitted or netted fabric and characteristic of the present invention.

For the purpose of obtaining an article having a very high degree of flexibility, it is preferable to employ a doping composition containing a plasticizing agent for the polymerized vinyl compound, cellulose ester or ether or resin forming the base thereof. I have found however that for electrical insulation purposes the well-known camphor substitutes are by no means all suitable, and in fact the majority of the synthetic products which have a high plasticizing power so reduce the electrical resistance of the polymerized vinyl acetate or other base that the composition is rendered useless for the purpose of manufacturing electric cables.

On the other hand I have found that plasticizers which are phenolic bodies or are ester or ethers of phenolic bodies are highly suitable for plasticizing polymerized vinyl acetate and other polymerized vinyl compounds or other bases previously mentioned so as to produce compositions which have a high electrical resistance and are therefore suitable for insulating electrical conductors of all kinds and are particularly suitable for cable work. Such plasticizers are described in U. S. application S. No. 578,195 filed November 30, 1931, corresponding to British application S. No. 38955/30.

The plasticizer may be used in the composition in a proportion consistent with the softness or flexibility desired. In general it is not desirable to employ proportions based on the polymerized vinyl acetate or other polymerized vinyl compound or other base of under 10% and in fact it is better to employ proportions of 20 to 30% or even much higher, for example 50, 80, 100 or even 150% or more. In some cases, however, the proportion of plasticizer is limited by considerations of the product becoming unduly sticky. I have found that resins, either natural or artificial, may be added to the polymerized vinyl or cellulose ester or ether compositions so as to increase the amount of plasticizer which the composition can contain without the films or other products resulting therefrom being unduly sticky. Whether or not the quantity of plasticizer is sufficient to render the composition sticky, the addition of resin to the composition may be of advantage from another aspect. It is found that certain resins, both natural and artificial, are capable of increasing the range of flexibility of the plasticized polymerized vinyl compositions used in accordance with the present invention, so that not only may the entire composition have a considerable degree of flexibility but this flexibility is maintained throughout a considerable range of temperature, which is of importance from the electrical insulation point of view. Thus for instance natural shellac added to a polymerized vinyl acetate composition increases the range of flexibility and moreover allows tricresyl phosphate, or any of the other phenolic plasticizers previously referred to, to be used in the composition to an extent up to about 150% or more on the weight of the polymerized vinyl acetate, assuming that the shellac is used in about an equal proportion to the vinyl acetate. Lower proportions of plasticizers may of course be employed, for example one hundred to one hundred and forty parts of plasticizer to one hundred parts of polymerized vinyl acetate and one hundred parts of natural shellac, the resulting product being of very high flexibility and high resistance properties. Other natural resins may be employed either for the purpose of preventing stickiness or for the purpose of improving the flexibility range of the composition. Kauri resin is a further example, though this does not appear to be so suitable as shellac. Again synthetic resins may be employed, and for this purpose it is best to use the synthetic resins which are not liable to further condensation when heated to temperatures up to 80 or 100° C., and preferably not liable to further condensation at considerably higher temperatures. The simple phenol-aldehyde synthetic resins are not so suitable for this purpose, though of course the desirability of adding them to the compositions depends to some extent upon the particular application of the compositions and the conditions to which they will be subjected in their subsequent application. The phenol-aldehyde synthetic resins obtained in presence of plasticizing agents as described below may however be used very satisfactorily. A highly suitable synthetic resin for the purpose of the present invention is the resin obtainable by condensation of formaldehyde with diphenylol propane or with the crude condensation product of phenol and acetone. Very useful compositions are, for example, those prepared with the aid of polymerized vinyl acetate, an equal or somewhat smaller amount down to half the quantity of diphenylol propane formaldehyde resin, and a quantity of tricresyl phosphate about equal to the quantity of diphenylol propane formaldehyde resin. Similarly the resins formed by condensation of diphenylol propane with furfural or with other aldehydes may be used, or the resinous condensation products of formaldehyde, furfural or other aldehydes with other condensation products of ketones and phenols, including the condensation products of phenols with the ketones of the cyclo paraffin series, such as cyclohexanone, cyclopentanone and the like. Again the resinous products obtainable from phenolic bodies, including phenol itself, the cresols, the xylenols, resorcin and pyrocatechin, and acetone or other aliphatic ketones or the cyclo paraffin ketones, such as cyclohexanone may be used, and in addition the synthetic resins obtainable from furfural, benzaldehyde or other aldehydes and acetone or other ketones. Further useful synthetic resins are those produced from phenols including cresols and xylenols by condensation with chlor-acetone, furfural, allyl alcohol and other allyl compounds, (compare U. S. application S. No. 399,880 filed 15th October, 1929 which has matured into Patent No. 1,940,727) sulphur chloride, acetaldehyde, croton aldehyde, keto butanol and chloral. These resins may be hardened with formaldehyde or furfural. In addition the synthetic resins obtainable from formaldehyde and benzene toluene, or xylene sulphonamides, the type obtainable from furfural and aniline and the resins obtainable by condensation of phenoxy-acetone may be used. Moreover any of the above resins which contain phenolic groups may be esterified or etherified, and further the resins may if desired be halogenated.

It is not of course necessary that the complex of resin and polymerized vinyl acetate or other polymerized vinyl compound should have a higher electrical resistance than the polymerized vinyl compound itself, since for many purposes the specific electrical resistance of the polymerized vinyl compound is itself sufficient or more than sufficient, and the criterion to be observed is that the resin, in common with the plasticizer used, shall not substantially reduce the specific electrical resistance or at least shall not reduce it below the value required for any specific purpose. The synthetic resins listed above are particularly valuable in that the mixture with polymerized vinyl compounds has an equal or higher electrical resistance than the polymerized vinyl compounds themselves when tested under moist conditions.

With further reference to the plasticizers and resins, it will be noted that diphenylol propane, which is obtained by condensation of acetone and phenol, may be used as plasticizer and acetone phenol resin, also obtained by condensation of acetone and phenol, may be used as resin, and similarly many other intermediate products of condensation obtained before resin formation sets in or becomes substantial may be used as plasticizers and the corresponding resins may be added to the compositions.

Many of the synthetic resins which may be used for the compositions according to the present invention are capable of existing in an infusible insoluble state, and in this form are less suitable for the purpose of the present invention than in the form in which they are soluble. However I have found that, if the condensation to produce the resin or at least the final stage of such condensation be carried out in presence of triphenyl phosphate, tricresyl phosphate or other plasticizer for the finished resin, over-condensation to an insoluble infusible resin is readily prevented and moreover the whole reaction is more readily controlled. This process of preventing over-condensation may be used in the manufacture of any synthetic resins which can be condensed to the infusible insoluble state.

Most of the so-called camphor substitutes which have been proposed or are in use in the nitro-cellulose industry and in the general industry of cellulose esters and ethers are also capable of plasticizing the synthetic resins with which the present invention is concerned. However in the choice of a plasticizer for use in controlling the condensation, it is desirable that the plasticizing agent selected should not itself be capable of taking part in the condensation. Compounds which I have found particularly valuable for the purpose are the phosphates of phenols or naphthols or their homologues or substitution products including the halogenated phenolic bodies, e. g. triphenyl and tricresyl phosphates, and the other phenolic plasticizers mentioned above. It is particularly desirable to use a plasticizer which is subsequently to form part of the lacquer composition.

The quantity of plasticizing agent used in the condensation may vary very considerably and I have found that very good results are obtained by using a quantity of plasticizer varying from one eighth the weight of the resin to be formed or of the intermediate resin body employed for the reaction up to twice the weight of the said resin. Inasmuch as the plasticizing agent is intimately mixed with the final resin product it will be seen that the particular application to which the resin-plasticizing agent complex is to be put determines to some extent the amount of plasticizer which is to be used, though it is to be noted that the plasticizing agent may if desired be removed from the resin after the reaction or its quantity may be reduced.

The following examples illustrate the manufacture of synthetic resins in accordance with this special process:—

*Example 1*

| | Parts |
|---|---|
| Commercial cresol | 220 |
| 40% formaldehyde solution | 180 |
| Phosphoric acid | 1 |
| Tricresyl phosphate | 100 | are heated under reflux in a jacketed vessel by means of steam or oil at 110° C. until a soft resin is formed. The soft resin is washed with water and distilled in vacuo until the resin gives a very slightly cloudy solution in acetone. The excess reagents are removed during this distillation and there remains a clear resin which is hard when cold.

*Example 2*

| | Parts |
|---|---|
| Crude diphenylol propane | 320 |
| 40% formaldehyde solution | 128 |
| Phosphoric acid | 1 | are heated under reflux in a jacketted vessel by means of steam or oil at 110° C. for 10 to 12 hours or until a resin is formed which is hard and brittle at ordinary temperatures. The resin is washed with boiling water to remove most of the catalyst and excess reagents, but should not be continued sufficiently to produce an over-condensation to the insoluble and infusible stage. Usually three hours' washing suffices and when excess wash water is removed the resin is a white to yellow opaque solid containing approximately 20% of water. To this batch of resin 64 lbs. of tricresyl phosphate are added and the mixture heated preferably with stirring and either in vacuo or in an open vessel until no more water is driven off. The fused mass is then raised to about 130 to 160° C. and kept at this temperature until a sample shows a slightly cloudy solution in acetone. It is then run off and allowed to cool.

Though polymerized vinyl acetate has been more specifically referred to above, other polymerized vinyl compounds may be employed, and the invention may be said to contemplate broadly the application of compounds which may be considered to be derivatives of polymerized vinyl alcohol and its homologues and substitution products in which the hydroxy groups are substituted by groups which lend to the vinyl compound resistance to water, as for example ester or ether groups. All such compounds are in the claims included in the generic expression polymerized vinyl compounds. I prefer to employ ester groups of organic acids, for example organic acids of the aliphatic series, such as acetic acid, chloracetic acid or propionic acid and the like or of the aromatic series, such as benzoic acid, and again it is preferable that the ester groups should not contain free hydroxy or free carboxy groups. Thus polymerized vinyl esters of mono carboxylic acids containing no hydroxy groups are very suitable for the purpose of the present invention. Similarly it is preferred to employ polymerized vinyl ethers in which the ether groups do not contain free hydroxy or carboxy groups.

Again, the cellulose ester or ether employed either as base fabric or in the doping composition may be in any desired stage of hydrolysis or ripening. For example an acetone-soluble or a chloroform-soluble cellulose acetate may be used. As already explained when doping a cellulose derivative fabric with a composition containing a cellulose derivative, it is preferable to employ derivatives having different solubility characteristics. Other cellulose esters or ethers which may be used include cellulose formate, propionate and butyrate, and ethyl, methyl and benzyl celluloses. As with the vinyl compounds it is preferable to employ water resistant derivatives, especially for insulation purposes, and to this end the cellulose derivatives in which the ester or ether groups contain no free hydroxy or carboxy groups are especially suitable.

The compositions described above may be applied to the knitted or netted fabrics in any suitable manner, and in a more or less molten or dissolved form. If the composition be sufficiently fluid, as for example by inclusion therein of volatile solvents, it may be applied to the fabric by spraying or brushing methods, sufficient of the composition being preferably applied to fill completely interstices between the threads of the fabric. Alternatively the fabric may be passed directly through a bath containing the molten or dissolved composition, and any excess removed, if desired or requisite, by suitable means, as for example by passing the fabric in contact with a doctor-blade adapted to remove the excess. A further method consists in extruding the compositions on to the fabric. For example slits or other suitably shaped orifices may be used to extrude a band of the composition on to the travelling fabric. Preferably such a slit is arranged on each side of the fabric being coated so as to cover thoroughly both sides. As an alternative an electrical conductor may be wound first with the cotton, cellulose acetate or other knitted or netted fabric and then doped with the lacquer composition.

Where relatively heavy coatings are to be applied directly to the fabric it is desirable to apply a number of relatively thin coatings and to dry each coating before the application of the next coating.

In order to obtain uniform insulating properties with any given composition it is important to standardize the drying operation which follows the application of the lacquer composition in conjunction with a small or large quantity of a volatile solvent. I have found in fact that it is highly desirable indeed to dry at an elevated temperature for a considerable period and especially for some hours. I have found that a drying effected at 100–120° C. for 3 to 4 hours yields very satisfactory results.

The impregnated fabrics, if desired after cutting into suitable strips, may be wound on to electrical conductors by methods known in the art. In the case of cables containing a number of insulated conductors the individual conductors may if desired be first insulated by means of the doped fabrics and the individually insulated conductors then embedded in a further mass of the insulating composition or wound with doped fabric so as to form the cable. If desired the cable may be armoured and sheathed with any desired finish. In the case of a sheath of rubber protective coatings may be applied as described in U. S. application S. No. 557,993 filed 19th August, 1931, which has matured into Patent No. 1,977,643.

As already indicated the impregnated fabrics are most valuable in their application to electrical insulation purposes. However, numerous other applications are possible inasmuch as I find that their high flexibility coupled with their high resistance to humid conditions render them suitable for other purposes, and particularly purposes in which high resistance to corrosion and high resistance to the attack of water or humid conditions come into consideration. Thus for example the doped fabrics may be used for wrapping paper or for purposes to which oiled silk goods are at present applied, as for example for tobacco pouches or for linings therefor, or for bandaging purposes.

The present invention further includes laminating the doped fabrics or other materials so as to obtain a more or less thick composite product. Thus for example 6–12 or even more layers of doped fabric may be applied to each other before or after drying of the lacquer composition, and may be caused to adhere under heat and/or pressure. In the actual wrapping of cables or like electrical conductors, it is desirable to apply a number of layers of doped fabric to the conductor and then to apply heat or pressure so as to cause the separate layers to adhere to each other. The application of heat and pressure may be achieved in the known process of covering the cable with a lead sheath, which in some applications, as for example for submarine or subterranean cables, is desirable. In such laminated products the heat and pressure may be sufficient to cause the product to appear homogeneous. A laminated product obtained by causing adhesion between a number of thicknesses of doped fabric may be applied, especially where transparent products are produced, for motor-car wind screens and windows and the like. Further the doped material and preferably the laminated product obtained from a number of sheets of such material may be applied to the manufacture of laminated glass using either ordinary window or plate glass, or if desired silica glass or glass of high silica content. The laminated product may be placed, with or without previous softening, between sheets of glass, which may, if desired, receive a previous coating of cellulose acetate, cellulose nitrate, gelatin or other suitable adhesive, though this is not necessary, and the whole pressed together to form the reinforced glass.

While a number of applications of the doped fabrics have been given above, it will be readily apparent that this list of applications is by no means exhaustive, and the present invention in addition to including the doped fabrics includes all applications of the same.

The following examples illustrate the application of polymerized vinyl compositions to fabrics for use for insulating purposes according to the invention, but they are not to be considered as limiting the invention in any way:—

*Example 3*

A cellulose acetate knitted fabric, e. g. a lock-knit fabric is coated with the following composition:—

| | Parts |
|---|---|
| Polymerized vinyl acetate | 100 |
| Diphenylol propane formaldehyde synthetic resin | 45 |
| Tricresyl phosphate | 65 |
| Alcohol | 940 |
| Acetone | 60 | so as to give a weight of dope of from 5 to 10 ozs. per square yard. The doped fabric is then dried in air at room temperature for a considerable period or preferably at 100 to 120° C. for 1 to 5 hours. It is then cut up into strips for winding electrical conductors in known manner. The windings on the conductor may be caused to coalesce by application of heat or by application of solvents. Solvents are less advantageous. The insulated conductor, for example an insulated cable, may if desired be covered with a lead sheath and subjected to the action of heat while enclosed in the lead sheath. The sheath may then be removed.

*Example 4*

A composition consisting of:—

| | Parts |
|---|---|
| Polymerized vinyl acetate | 100 |
| Diphenylol propane formaldehyde synthetic resin | 40 |
| Shellac | 60 |
| Tricresyl phosphate | 120 | is dissolved in a suitable solvent, for example that indicated in Example 3, and applied to a fabric as described in Example 3.

*Example 5*

A composition consisting of:—

| | Parts |
|---|---|
| Polymerized vinyl acetate (insoluble in alcohol) | 100 |
| Diphenylol propane formaldehyde synthetic resin | 10 |
| Tricresyl phosphate | 40 | is dissolved in a mixture of 200 parts of acetone and 800 parts of butyl acetate and applied to a knitted fabric, and especially a cellulose acetate knitted fabric, weighing 3 ozs. per square yard so as to give a weight of 5 to 10 ozs. of dope per yard. It is then dried and applied for insulating purposes as described in Example 3.

Example 6

A polymerized vinyl compound is prepared from

|  | Parts |
|---|---|
| Polymerized vinyl acetate | 100 |
| Diphenylol propane formaldehyde resin-tricresyl phosphate complex prepared as in Example 2 above and containing 25 parts of the resin and 10 parts of the plasticizer | 35 |
| Diphenylol propane | 65 |

The composition is fused at a temperature of 160 to 180° C. and is applied in this form to a cotton or cellulose acetate knitted or netted fabric.

Example 7

A composition consisting of:—

|  | Parts |
|---|---|
| Polymerized vinyl acetate | 110 |
| Cresol-formaldehyde resin-tricresyl phosphate complex, prepared as described in Example 1 | 90 |
| Tricresyl phosphate | 35 | is dissolved in 1200 parts of alcohol and applied as described above in Examples 3 and 5.

Example 8

A composition consisting of:—

|  | Parts |
|---|---|
| Polymerized vinyl acetate | 100 |
| Shellac | 80 |
| Diphenylol propane formaldehyde synthetic resin | 20 |
| Diphenylol cyclohexane | 20 |
| Triphenyl phosphate | 100 |
| Filler (e. g. silica powder) | 20–40 |
| Acetone | 100 |
| Butyl acetate | 900 | is applied by the methods described in Examples 3 and 5 above. The diphenylol propane formaldehyde synthetic resin may be replaced by a synthetic resin prepared from diphenylol propane and chlor-acetone.

Example 9

A composition consisting of:—

|  | Parts |
|---|---|
| Polymerized vinyl acetate | 100 |
| Triphenyl phosphate | 25 |
| Alcohol | 600 | is applied as described above.

Example 10

A composition consisting of:—

|  | Parts |
|---|---|
| Polymerized vinyl acetate | 100 |
| Diphenylol cyclohexane formaldehyde synthetic resin | 60 |
| Crude diphenylol propane | 40 |
| Tricresyl phosphate | 100 |
| Acetone | 200 |
| Alcohol | 600 |
| Butyl acetate | 200 | is used to coat a conductor which has already been wrapped or covered with knitted or netted fabric. The doped covered conductor is dried as previously described.

The expression "a knitted fabric" used in the appendant claims includes other fabrics such for example as netted fabrics which, because of their loop construction, are closely related to knitted fabrics.

In the figure of the accompanying drawing there is illustrated an example of an electrical conductor according to the present invention, showing a flexible conductor having a core of conducting material which is insulated with layers of a knitted fabric having a basis of an organic derivative of cellulose and impregnated with a composition containing a polymerized vinyl compound and a plasticizer.

What I claim and desire to secure by Letters Patent is:—

1. Flexible electrical conductors insulated with a knitted fabric having a basis of cellulose acetate, in which at least the surface of the fabric contains a composition comprising a polymerized vinyl acetate and a plasticizer selected from the group consisting of compounds containing phenolic hydroxy radicles and derivatives of said compounds wherein the phenolic radicles are esterified or etherified.

2. Flexible electrical cables and conductors insulated with a knitted fabric having a basis of an organic derivative of cellulose, in which at least the surface of the fabric contains a composition comprising a polymerized vinyl compound, a resin and a plasticizer selected from the group consisting of compounds containing phenolic hydroxy radicles and derivatives of said compounds wherein the phenolic radicles are esterified or etherified.

3. Flexible electrical cables and conductors insulated with a knitted fabric having a basis of cellulose acetate, in which at least the surface of the fabric contains a composition comprising polymerized vinyl acetate, a plasticizer selected from the group consisting of diphenyl propane, triphenyl phosphate, and tricresyl phosphate, and a resin selected from the group consisting of shellac and diphenylol propane-formaldehyde resin.

4. Flexible electrical conductors in combination with an insulation comprising a knitted fabric, at least the surface of which fabric contains a composition comprising a polymerized vinyl compound and a high proportion of a plasticizer selected from the group consisting of compounds containing phenolic hydroxy radicles and derivatives of said compounds wherein the phenolic radicles are esterified or etherified.

5. Flexible electrical conductors insulated with a knitted fabric having a basis of cellulose acetate, at least the surface of which fabric contains a composition comprising a polymerized vinyl acetate, a plasticizer selected from the group consisting of compounds containing phenolic hydroxy radicles and derivatives of said compounds wherein the phenolic radicles are esterified or etherified and a resin selected from the group consisting of shellac and diphenylol propane formaldehyde resin.

6. Flexible electrical conductors in combination with an insulation comprising a knitted fabric, at least the surface of which fabric contains a composition comprising a polymerized vinyl compound free from uncombined hydroxy or carboxy groups, and a high proportion of a plasticizer selected from the group consisting of compounds containing phenolic hydroxy radicles and derivatives of said compounds wherein the phenolic radicles are esterified or etherified.

WILLIAM HENRY MOSS.

CERTIFICATE OF CORRECTION.

Patent No. 2,057,689.                                             October 20, 1936

WILLIAM HENRY MOSS.

It is hereby certified that error appears in the printed specification of the above numbered patent requiring correction as follows: Page 5, first column, line 1, before the word "yard" insert square; and that the said Letters Patent should be read with this correction therein that the same may conform to the record of the case in the Patent Office.

Signed and sealed this 15th day of December, A. D. 1936.

Henry Van Arsdale (Seal)                                      Acting Commissioner of Patents.